OR 3,560,071

T 3032N
X 3039D
X 3046C (4)

Feb. 2, 1971 D. SILVERMAN ET AL 3,560,071

HOLOGRAPHIC RECORDING AND VISUAL DISPLAY SYSTEMS

Filed April 17, 1968 4 Sheets-Sheet 1

INVENTORS

Daniel Silverman

Everett A. Johnson

Feb. 2, 1971 D. SILVERMAN ET AL 3,560,071

HOLOGRAPHIC RECORDING AND VISUAL DISPLAY SYSTEMS

Filed April 17, 1968 4 Sheets-Sheet 2

INVENTORS

Daniel Silverman
Everett A. Johnson

INVENTORS

Daniel Silverman
Everett A. Johnson

HOLOGRAPHIC RECORDING AND VISUAL DISPLAY SYSTEMS

Filed April 17, 1966 4 Sheets-Sheet 4

Daniel Silverman
Everett A. Johnson
INVENTORS.

United States Patent Office 3,560,071

Patented Feb. 2, 1971

3,560,071

HOLOGRAPHIC RECORDING AND VISUAL DISPLAY SYSTEMS

Daniel Silverman, 5969 S. Birmingham, Tulsa, Okla. 74105, and Everett A. Johnson, 15 S. Prospect Ave., Park Ridge, Ill. 60068

Filed Apr. 17, 1968, Ser. No. 721,989

Int. Cl. G02b *27/22*

U.S. Cl. 350—3.5 18 Claims

ABSTRACT OF THE DISCLOSURE

This invention is concerned with methods and apparatus for recording multiple exposure holograms on a film record and displaying reconstructed images of the separately recorded subjects. Means are provided, by the use of simultaneous application of multiple different reference beams, to reconstruct a plurality of images, each of which can be separately controlled in intensity. Also, the recording of the separate subjects can be controlled in a predetermined timed sequence, and the corresponding reconstruction of the plurality of images can be controlled in the same or different timing sequence. Means are provided for recording the separate subjects by keeping the subject and reference beam in fixed directions and rotating the plane of the recording film.

This invention is concerned with the preparation of a storage record of information at high storage density and for its rapid retrieval and display. More particularly it is concerned with storage of information on radiation sensitive media in the form of multiple exposure holograms, any one of which can be reconstructed and displayed at will. More than one reconstructed image can be displayed simultaneously and in different light intensities.

In the prior art, the storage of information on film at high density has generally been in the form of reduced scale replicas or microreproductions, or in the form of patterns of spots each of which spots comprise units, or bits, of information. With present day commercial films and their high resolution capabilities, it is possible to create very high density patterns of spots, such as $10^6$ or more spots per square inch. There is still a weakness in such systems, however, and this concerns the effect of blemishes in the film, or dust or dirt particles on the film. If these obscure one or more of the spots or bits, they have removed the information in those spots, which cannot be retrieved, and are thus lost.

In this invention the information, be it a pattern of spots or a microfacsimile, is stored on the film in the form of a hologram, which is a complex diffraction pattern of light and dark spaces representing the information. It is a characteristic of a hologram that each small area of the hologram contains information about the entire subject, or in other words, an image of the subject can be reconstructed from the entire hologram, or from any part of it. Therefor, if part of the hologram is obscured by a blemish in the film, or by superposed dust or dirt particles, the image of the subject can still be reconstructed from the remainder of the hologram. Of course, something is lost, which is the "quality" of the image, or its resolution. However, all of the information in the subject will be present in the reconstructed image.

We propose to further increase the storage density of information on the film record, by multiple exposing the film with successive subjects in such a way that images of any one of the separate subjects can be reconstructed at will without interference from any of the other subjects recorded on the film record.

It is therefore an important object of this invention to create an information system in which the information record has a low susceptibility to dust, dirt and blemishes, to the end that a minimum of information is lost due to these causes. It is a further object to increase the storage density by superimposing multiple holographic images on the film, any one of which can be withdrawn from storage and displayed independently of the others. It is a further object to display the informaiton for machine readout and/or visual examination.

It is a further object of this invention to provide means for precisely relatively positioning the subject, the reference beam and the holographic film so that the image of a spot pattern subject will be displayed in a predetermined position to facilitate scanning the spot pattern.

It is a further object of this invention to provide means to synchronously change from one reference beam to another as the hologram film is traversed from one exposure frame to another.

These and other objects and details of this invention will be understood more clearly from the following description when taken in connection with the accompanying drawings, showing by way of examples, several embodiments of the invention. Referring now to the drawings.

FIGS. 4*a*, 4*b* and 4*c* show how the recorded image is reconstructed and how the image is utilized.

Figures 1, 1A, 2, 2A, 2B, 3:
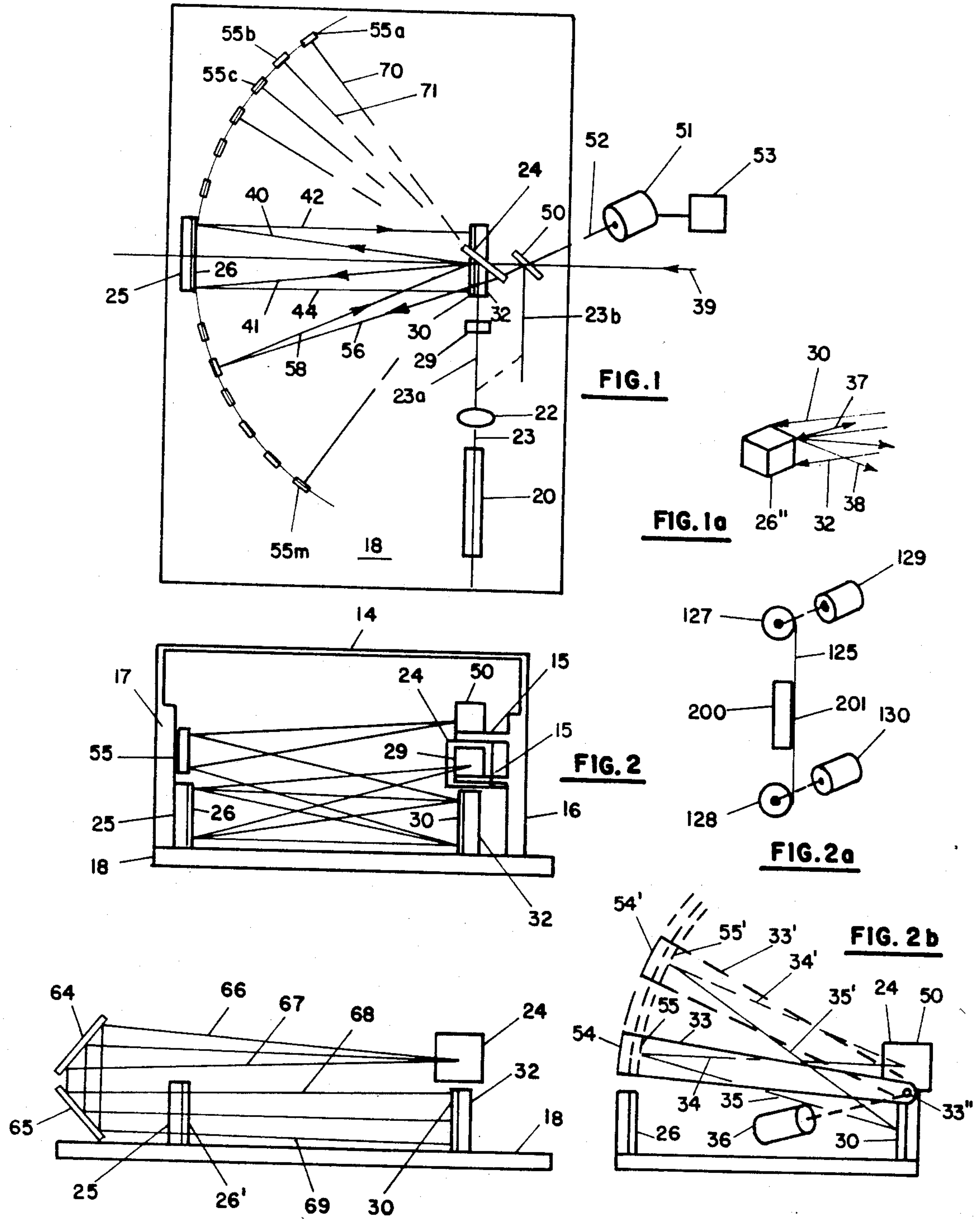
FIGS. 1 and 2 show two views of one embodiment of this invention in which the plurality of reference beams reach the hologram film from different directions.
FIGS. 1*a*, 2*a* and 2*b* show additional details.
FIG. 3 shows an embodiment in which the subject is a transparency and is illuminated by back lighting.
Figure 5:
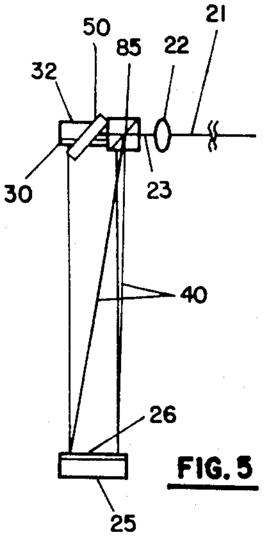

FIG. 5 shows an alternative optical system to that of FIG. 1.

Figure 6:
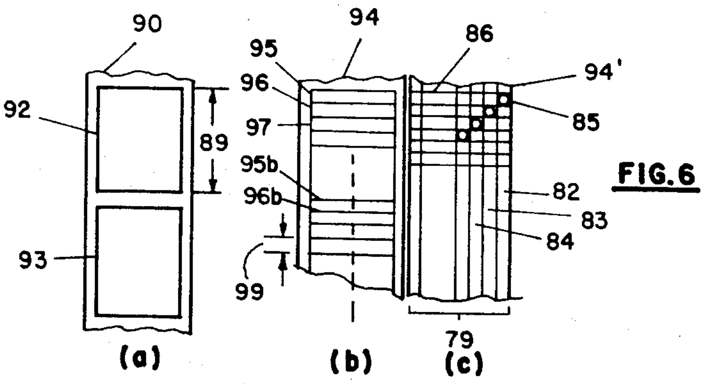

FIGS. 6*a*, 6*b* and 6*c* show alternative embodiments of the hologram film.

Figure 7:
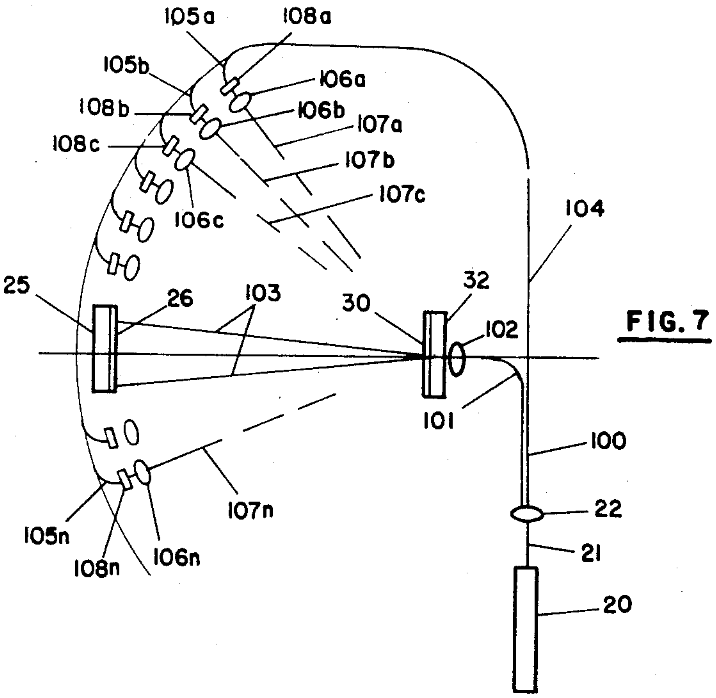

FIG. 7 shows an alternative embodiment to that of FIG. 1 utilizing fiber optics.

Figure 8:
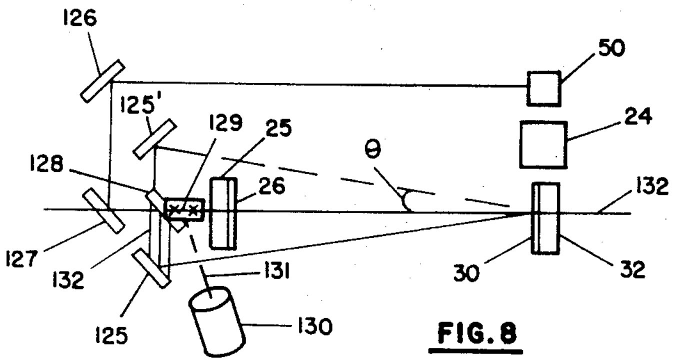

FIG. 8 shows an alternative embodiment to that of FIG. 1 in which the plurality of reference beams reach the hologram film at the same angle, but at different azimuths.

Figures 4, 9:
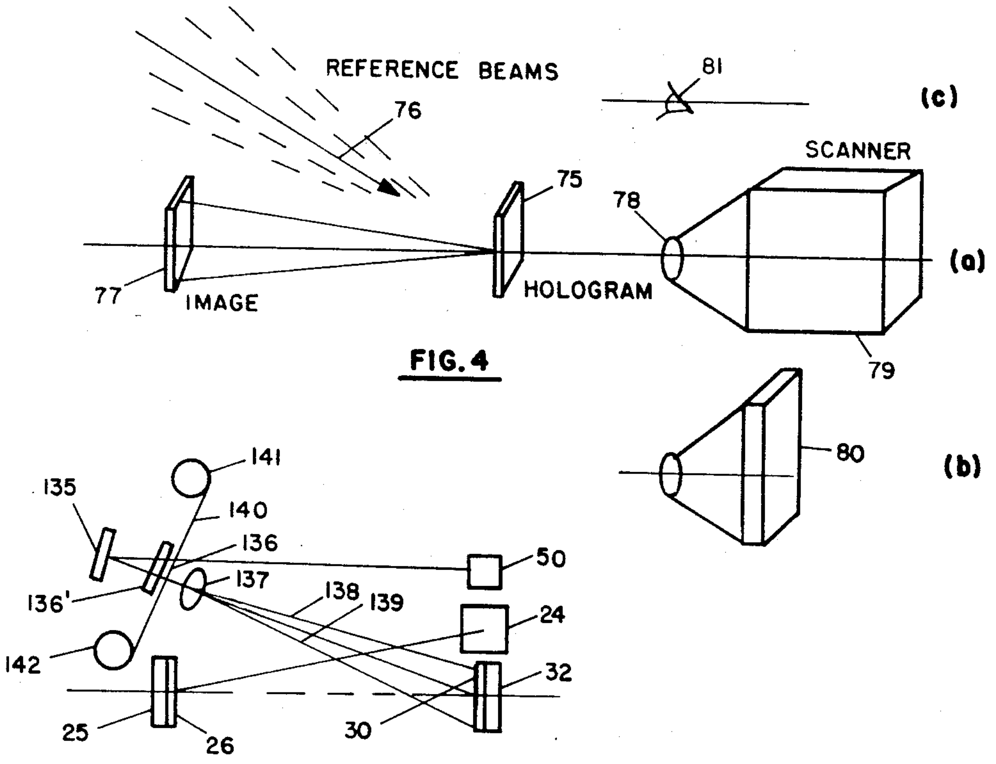

FIG. 9 illustrates an embodiment in which the plurality of reference beams have different patterns of intensity.

Figure 10:
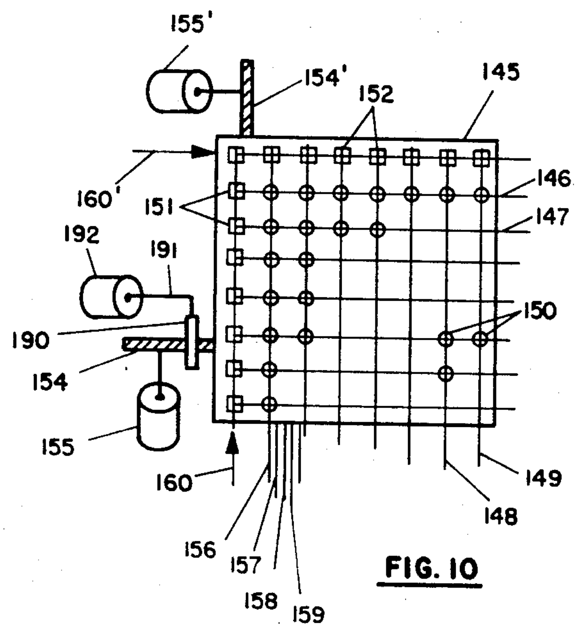

FIG. 10 illustrates one embodiment of a subject card utilizing a pattern of information spots and a pattern of guide indicia.

Figure 11:
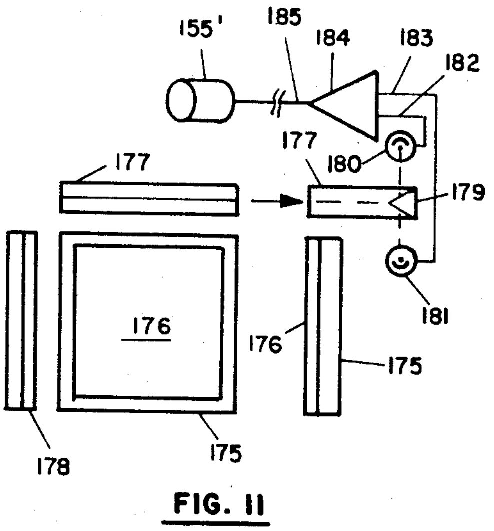

FIG. 11 illustrates an optical servo means for relatively positioning the subject card of FIG. 10 and the hologram positioning means.

Figures 12, 13:
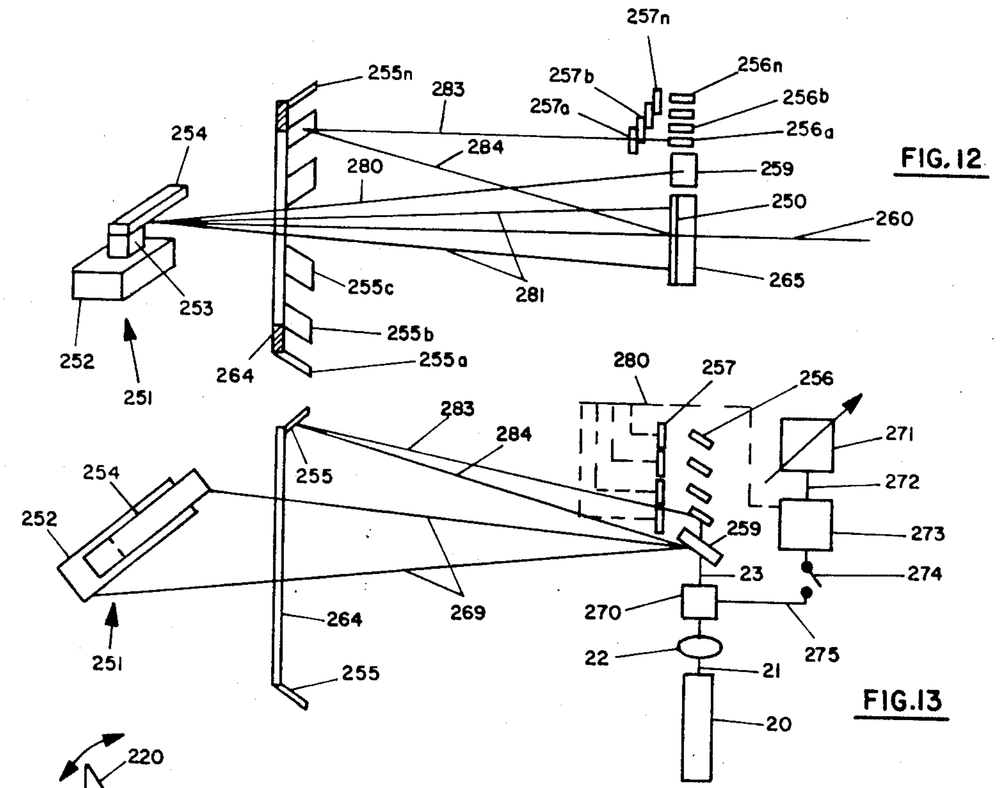

FIGS. 12 and 13 show schematically two views of a preferred embodiment of this invention.

Figure 14:
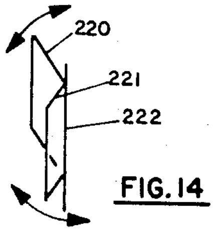

FIG. 14 illustrates means for obtaining a plurality of mirrors to get simultaneous reference beams.

Figure 15:
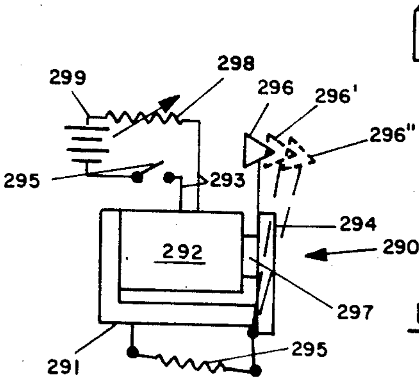

FIG. 15 illustrates one type of removable mask means.

Figure 16:
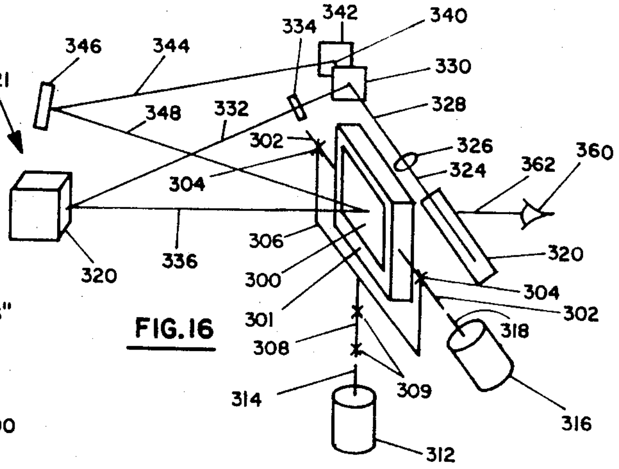

FIG. 16 illustrates another embodiment of this invention in which the recording film is rotated in azimuth and elevation between exposures.

Referring now to the figures, and particularly to FIGS. 1 and 2, we show in plan and elevation respectively, one embodiment of an apparatus for recording holographic information on a film, and for reading out, or reconstructing images of the holographic information. In FIG. 1 numeral 20 represents a source of intense coherent light. This is preferably a laser of the continuous or pulsed types, which are well well known in the art and their use in the preparation of holograms has been well publicized. For convenience, the apparatus will be discussed in terms of a continuous gas laser. No detailed explanation of the use of lasers in the making and reading of holographs will be given. There has been adequate publication of this art, and the reader is referred to the many articles and books in the literature, such as the article by E. N. Leith and J. Upatnieks published in the Journal of the Optical Soc. Amer., vol. 53, #12, p. 1372 (1963).

The laser beam 21 is modified by optics 22 to form a beam 23 (23*a*, 23*b*) which is deflected by mirror 24 to irradiate the subject, or information 26, that is to be recorded. This subject can be a plane diagram, picture, pattern of spots of light and dark, or colors, a transparency, or a three dimensional solid object, etc. In FIG. 1 we show an opaque, front lighted plane subject. In FIG. 1*a* we show a three dimensional object 26″, and in FIG. 3 we show a back lighted transparency 26′. The subject 26 is positioned in a subject positioning or mounting means 25.

In FIGS. 1 and 2 the rays 40 and 41 from mirror flood the subject and part of this radiation is reflected and scattered, and generally redirected back 42, 44 to the film 30, on which the hologram is to be recorded. This film must, of course, be sensitive to the radiation from the source 20. The mirror 24 may be mounted above and centered over the film 30, although its position is not too critical.

Above the mirror 24 is another mirror 50 rotatable about a vertical axis. In FIG. 1 it is shown for clarity, displaced to the right, although in FIG. 2 it is shown in its optimum position centered over the plane of the film and over the centerline of the film 30. This mirror receives part 23*b* of the radiation of the beam 23, and reflects it to one or another of the plurality of mirrors 55*a*, 55*b*, 55*c*, 55*n* etc. These are arranged in a horizontal plane with their surfaces substantially perpendicular to the radii to the center of the film. Thus, as the mirror 50 is turned by motor 51, drive 52, and control 53, light from beam 23 is sent to a mirror 55 by ray 56, for example, and returned to film 30 by ray 58, FIG. 2. Thus by turning mirror 50 appropriately, light from laser 20 can be made to irradiate film 30 from any desired one of the directions such as 70, 71, etc. provided by the plurality of mirrors 55.

Now, in the holographic process, it is necessary, in order to record a hologram, to receive light at the film from the irradiated subject *and* simultaneously from a reference beam, preferably at a different angle to the film than that from the subject. The radiation in the reference beam and from the subject should come from the same coherent source 20, however. The light reaching the film 30 by way of mirrors 50 and 55 constitute the reference beams.

Once a hologram is recorded on the film by exposing it simultaneously to the light from the subject and to a reference beam from a different angle, such as 70, for example. The film can then be developed and replaced in its original position. The film 30 would normally be held in a hologram mounting or positioning means 32, so that the developed film can be precisely repositioned to its original position. Then when the light to mirror 24 is blocked by mask 29, and light from source 20 is directed to mirrors 50, 55 and back to the developed film 30, the image of subject 26 will be seen in the same position as originally occupied by the subject 26, if the eye is directed along direction 39. The line 39 connecting hologram and subject can be called the subject line.

Of course, a camera can be directed along direction 39 instead of the eye and it can record the image of the subject 26. The resulting picture recorded by the camera can be read, to retrieve the detailed information. Or, any one of the many types of scanners described in the art can be used to read or scan the image to retrieve the detailed information from the image.

Now, starting with a fresh unexposed film 30, and a subject 26*a*, the mirror 50 is turned to utilize miror 55*a* and a first hologram 30*a* is recorded. Without moving the film 30 a second subject 26*b* is placed at position 26, and mirror 50 is rotated to utilize mirror 55*b*, and a second exposure or second hologram is recorded. In this manner as many separate exposures can be made as there are possible distinct or separate angles 70, 71, etc. of the reference beams. Although one might conceive of a very great many angles and thus separate exposure, for practical purposes there is a limit to avoid crosstalk, although as many as 10 to 15 or more separate exposures on the same film are possible. When the multiple exposed film 30 is developed and replaced into its original position, any one of the plurality of recorded images can be reconstructed by shutting off beam 23*a* and using beam 23*b*, and turning the mirror 50 to the desired mirror 55.

In FIG. 3 we show the mirror 24 directing its rays 66, 67 over the subject 26′ (which in this case might be a transparency of a microfilm or a spot pattern) to mirrors 64, 65, where it is directed to the back surface of the subject 26′. This backlighted transparency 26′ is now the subject, and the light diffracted by the transparency and redirected to the film 30 is combined with the reference beam from mirrors 50 and 55, to form the hologram.

It will be clear that the various optical elements, such as lenses, mirrors, films, etc. should be rigidly mounted to a base and frame shown schematically as 18, 17, 16, 15, etc., but well understood in the art, and should be enclosed in a light-tight case or housing, such as 14, etc.

The film 30 can be one of a series of separate chips of film, or it can be one of a plurality of separate frames on a strip film. Such a strip film system is illustrated in FIG. 2*a* where the film 125 is reeled on two reels 127, 128 and passes through a film gate 200, exposing a frame 201 of film. The film can be traversed by means of motors 129, 130 as is well known in the art. Precise means (not shown) for positioning the frame 201 in the film gate or hologram mounting means 200 will be described in connection with FIGS. 10 and 11.

It will be clear also that this film strip system of FIG. 2*a* can be used in place of the subject record 26, where any one of the frames on the proper film strip 125 can be presented as the subject to be recorded on the hologram film. These can of course be displayed by front lighting or back lighting as shown in FIGS. 1, 2 and 3.

We contemplate that the reconstructed images can be utilized in many ways, such as, (a) photographically copied, to be
  (1) scanned by a machine,
  (2) read visually,
(b) scanned by machine directly, to read the information, or
(c) visually displayed.

FIG. 4 illustrates how the multiple exposure hologram is used in the image reconstruction, and how the reconstructed images are utilized. Numeral 75 represents the developed hologram. The reconstructing irradiated coherent beam 76, arriving at one of many different discrete angles, unlocks and reconstructs the particular image that was recorded with that particular reference beam angle. The resulting reconstructed image is shown schematically at 77. This can be seen by placing the eye 81 at position 78 on the axis of the hologram. If desired, a camera 80 can be placed at 78 to record the image 77. Or a photo-optical scanner 79, such as is well known in the art can be placed at 78 to scan or read the pattern of spots in the hologram image.

In FIG. 2 we show the mirror 24 and the movable mirror 50 separated one above each other. Optically, it may be more convenient to have the two mirrors in-line along the direction of the laser beam 23. As shown in FIG. 5 this is accomplished by using instead of mirror 24, a partially silvered mirror or beam splitter 85. Thus the beam 23 enters the beam splitter 85. Part of the radiation is reflected 40 to subject 26. The remainder passes on through to the mirror 50 by means of which it is reflected to the mirrors 55.

In FIG. 1 we show the hologram as a single chip of film 30. However, if a large amount of data are to be stored, calling for many frames, it becomes convenient to use a long strip of film 125 as in FIG. 2*a* and to record separate frames along the length of the film.

Since a plurality of exposures are to be made, these can be made successively without moving the film, so that all of them will occupy the same space. This is illustrated in FIG. 6*a* by frames 92, 93 of film 90. On the other hand, if desired, as in FIG. 6*b*, the film can be shifted intermittently between exposures by a distance 99 which is a fraction of the frame length 89. This fraction will preferably be equal to $1/n$, where $n$ is the number of superimposed exposures on the film. Conversely the distance 99, called $d$, can be equal to $D/n$ where D is the longitudinal dimension of the exposed area (89), and $n$ is the number of partially superimposed images. $n$ will generally have a value of 5–10 or more, but is preferably at least 2. Numerals 95, 96, 97 represent the tops of successive frames, while 95*b*, 96*b*, 97*b* represent the bottoms of the corresponding frames.

In FIG. 6*c* we show a modified form of film 94′ to be used as a part of film 94 or as a separate film which carries the same frames 95, 96, 97, etc., as strip 94. It has an opaque section 79 carrying longitudinal strips 82, 83, 84 etc. A punched out or otherwise transparent or translucent area or spot 85 is placed in one or another of the strips 82, 83, 84 at a longitudinal position corresponding to each frame 95, 96, 97, etc. Thus, the horizontal and longitudinal position of each spot 85 is indicative of the particular frame to which it corresponds. Now, if this strip 94′ is placed in the position of film 30 and if light from beam 23 can be impressed on area 86, light will pass through each of the spots 85 in turn. Light from the spot in column 82 can be directed to mirror 55*a*, for example (such as by mirrors or optical fibers), from which it is reflected to the frame 95, for example. Similarly, as the strip film 94′ is advanced to the next frame 96, the next spot in column 83 is in the area 86 and receives light from 23 and passes it on to mirror 55*b* and back to frame 96, and so on. Thus, as the strip moves along, new spots 85 in 82, 83, 84, etc., are presented which control the illumination of the holograms on strip 94′ by choosing automatically the proper reference beam to record and/or reconstruct the holograms.

If the portion 79 of the film 94′ is prepared beforehand, with transparent spots in the proper positions, and if illuminated portion 86 is shielded from the unexposed film 95, etc. then the holograms can be recorded by controlling the particular reference beams (such as from mirrors 55) by passing the laser beam through the particular spot corresponding to the hologram frame being recorded. When prepared in this way, and the film developed, the plurality of holograms can be reconstructed sequentially by simply directing the beam 23 to area 86 and drawing the film strip through the hologram mounting means 32. This could be done quite rapidly, creating the illusion of a three dimensional moving picture.

While we prefer to have the control portion 94′ of the film strip with its columns 79 as part of the hologram film 94 itself, it is clear that the control portion 79 can be on a separate film strip from the hologram frames 95, 96, 97 etc., provided the two strips are traversed in synchronism, by means that are well known in the art. Of course, other means, equivalent to the perforated strip 94′ can be used, when driven synchronously with the film 94 to control the reference beams. For example, the motor 51 of FIG. 1, positioning the mirror 50 can be driven in accordance with motors 129, 130 of FIG. 2*a*, so that as the film 125 is moved to expose new frames, the mirror 50 is turned to a different mirror 55 to form a different reference beam.

In describing the apparatus of FIGS. 1 and 2 we have shown that they are purely schematic diagrams and show the essentials of the apparatus. However, to indicate that all the elements described are part of a complete system, and furthermore to indicate that all of the optical parts should be mounted rigidly with respect to each other we have schematically indicated a framework comprising a base 18, uprights 17 and 16 and brackets 15, etc. to hold the individual elements in proper position. Also, a housing or light shield 14 is required, particularly for the recording operation, to restrict the radiation falling on the film 30 to that from the object 26 and the reference beam. Of course, for the readout, reconstruction, or display of the hologram images, the illumination of the subject is cut off such as by the mask 29, and the reference beam alone is used. The housing 14 can be closed or open. However, if the reconstructed image is to be photographed or scanned it would still be desirable to keep the case 14 closed. It will be clear that if the instrument is to be used in a closed dark room, then the housing 14 would not be required. Also, while a laser beam is desired for the recording operation, it is not necessary to have such an intense illumination for reconstruction, and one or the other of several commercial (reasonably) monochromatic light sources can be used for reconstruction, at least for visual observation.

In FIGS. 1 and 2 we show how a plurality of mirrors 55 can be mounted in a circular frame with each mirror directed in the proper angle to reflect back to film 30 light that reaches it from mirror 50. We have described the mirrors 55 mounted in a horizontal plane. In FIG. 2*b* we show schematically a part of FIG. 2. In addition we show the mirror 55 mounted on a frame 54. The frame 54 is a circular frame carrying all of the mirrors 55. Frame 54 is supported by two radial arms 33 that are pivoted on a horizontal axis 33″. By means such as the motor 36 the arm 33 can be rotated to position 33′ carrying the frame 54 and mirrors 55 to positions 54′ and 55′. Thus a plurality K of positions of the frame 54 permit K times as many exposures of the film as there are mirrors 55. The mirrors 55 give a change in azimuth to the reference beams, while motor 36 provides K changes in elevation angle for each of the reference beams from mirrors 55.

As will be further described in connection with FIG. 7, the plurality of mirrors 55 can be displaced by the use of a plurality of optical fibers 104. The separate fiber ends 105 can of course be mounted in a frame like 54 and elevated through a plurality of angles to provide additional reference beams.

In FIG. 1 we show how by the use of a plurality of mirrors 55 it is possible to direct the reference beam to the first surface of the record 30, from any one of a plurality of discrete separate angles. In FIG. 7 we show another way to get the plurality of beams at different discrete angles. This involves a bundle of fiber optics 100. Part of the fibers 101 goes, with optics 102 to irradiate the subject 26 with rays 103. The other fibers are broken up into groups, each group 105*a*, 105*b*, 105*c*, etc., going to appropriate positions and directed along radii 107*a*, 107*b*, 107*c*, etc. Optics 106*a*, 106*b*, 106*c* etc. are required to provide a beam of the desired cross section to irradiate the record 30. Of course, since all of the fibers 104 will be carrying light all of the time it is necessary to provide shutters or masks 108*a*, 108*b*, 108*c* etc. to close off the light. Then by means (not shown), any one of the masks can be opened to pass light at that angle to the film. These shutters or masks can be small vanes attached to magnetic armatures or relays that can be operated by passing current through an associated magnetizing coil.

FIG. 8 illustrates in schematic form another embodiment of this invention, in which a plurality of positions of the reference beam relative to the hologram are provided by keeping the beam at the same angle with the perpendicular to the holographic record, but changing its azimuth. This is accomplished by a mirror 125 on arm 132 rotated about axis 129 by motor 130 through drive 131. Light from the laser beam 23 is carried to mirror 125 via mirrors 50, which is now fixed and not rotatable, 126, 127 and 128. Instead of rotating the arm 132 and mirror 125, a plurality of fixed mirrors like 125, can be mounted on a circular ring around axis 129 (coincident with the locus of mirror 125) and then simply rotating mirror 128 will carry light to each of the mirrors sequentially. By this means a plurality of images can be displayed in rapid succession. It will be clear that by suitably synchronizing motor 130 and drive 131 with the drive mechanism that moves film 94 (FIG. 6) then as the film is moved incrementally by distance 99, mirror 125 will move to a new reference beam position to correspond, and so on. We contemplate also, in connection with FIG. 8 having two or more sets of mirrors 125, 125' set at greater radius from the axis 132. When these are used, the angle $\theta$ will be greater than for the case illustrated. Thus a plurality of K sets of reference beams can be formed each having a different angle $\theta$ with the perpendicular to the film surface. Each set would have a plurality of reference beams each with constant angle $\theta$, but having a different one of a plurality of azimuth angle.

Another way to create a plurality of holograms on the record 30 is to use a plurality of coded reference beams. Such a coded reference beam is one that has a varied intensity of radiation over a cross-section of the beam. This can be done as illustrated in FIG. 9. Here the holographic film 30, subject 26 and mirror 24 are the same as in FIG. 2. However, instead of using a beam of uniform intensity as the reference beam as in FIG. 2, we propose to back light a transparency 136 by mirrors 50 and 135, and by means of optics 137 illuminate the film 30. This reference beam, modified by the transparency 136 in the gate 126', plus the light from the subject 26, both arriving together at the film will make a hologram. The reconstruction of this hologram can only be accomplished by irradiating the developed hologram 30 with the identically same reference beam, which is the beam 138, 139 from the transparency 136. However, a second hologram can be recorded on same film 30 (before development) by using a different beam 138, 139 derived from a differently coded transparency 136 and so on. The different transparencies can be mounted on a rotating disc or drum as is well known, or on a strip film such as 140 controlled by reels 141, 142 as is well known in the art.

By using a coded reference beam, the hologram can be reconstructed and the information read only by using the exact same reference beam in the exact same position. Thus the information on the hologram is completely private and cannot be read without having the precise coding mask that was used to record the hologram. This is a form of security storage, or scrambling of confidential information that is part of this invention.

The total number of points of light that can be recorded on the film 30 depends on the resolution of the film and the size of a diffraction pattern recorded on the film from a single point on the subject. The total number of such points of light is, in general, a very large number, so that many different holograms can be superimposed without serious loss of information due to overlapping of points. However, there will be spots from different holograms which are superimposed, and the double or triple exposure of such spots will introduce errors. For the case where the holograms represent pictorial subjects, whether from two dimensional or three dimensional subjects, these relatively few points of overlap are not likely to be troublesome. However, in the holographic recording of digital spot patterns where each spot or bit, is important, this overlapping of points may be troublesome. In preparing such digital holograms we propose to use spot pattern subjects as in FIG. 10 with appropriate guide indicia 151, 152, which are recorded in precise geometric relation to the matrix of rows 146, 147 and columns 148, 149, etc., if all of the subject cards 26 are prepared with the same matrix and guide indicia. Then by the use of motor 155 and screw feed 154, the subject card 145 can be traversed in steps, so that column of spots 156 of the matrix is successively placed at 157, 158, 159, etc. There may be as many positions as desired before the column 156 would be superimposed on the adjacent column of the matrix. The movement in horizontal traverse would be sensed by index 160.

In a similar way the card 145 can be traversed vertically in steps. Thus there are different matrix positions equal in number to twice the number of positions such as 157, 158, 159, etc. that can be occupied without overlapping spots on the hologram film. Of course, each different subject pattern will require a different card 145 or film frame 201 of FIG. 2*a*. However, by means of the guide indicia 151, 152, etc., sensors 160, 160' and appropriate servo means, each of the matrices can be accurately positioned with respect to the holographic film.

It will be clear that the precision of placement of the subject with respect to the holographic film is most important when the subject consists of a pattern of spots, each of which is an item of information. Generally, a spot scanner will be placed at the viewing point 78 and it is desirable that the spot matrix be positioned accurately with respect to the scanner.

The subject can be positioned directly with respect to the holographic film, or it can be positioned with respect to the subject mounting means, and the subject means positioned with respect to the hologram positioning means, and the hologram film positioned with respect to the hologram positioning means.

We show in FIG. 11 how a subject record (as in FIG. 10) containing a matrix of spots and guide indicia can be precisely positioned with respect to a remote frame of reference. This could be the hologram positioning means, for example. Assume that the subject record is of the form of card 145 containing a matrix of spots and longitudinal and transverse guide indicia. The indicia can be lines of spots, as shown, or continuous lines, etc.

The card 145 is imaged onto the frame 175 (which might hold a hologram film 176). There are two optical systems 177, 178 placed in such a position with respect to the frame and film, that when the matrix of card 145 is precisely positioned on the film 176 the guide indicia 152 and 151 will be precisely centered over the prisms 179, etc. Thus, half of the light transmitted through the translucent guides 152, for example, will fall on each side of prism 179 and each half will be reflected to the photo-electric sensors 180, 181. The outputs of these sensors go to servo amplifier 184 of conventional design and leads 185 to motor 155'. If the light falling on each sensor 180, 181 is the same, then there is no signal to the motor. If, because the matrix is not positioned properly over the film, the light is not balanced on the sensors 180, 181, when an appropriate signal will go from the amplifier 184 to the motor 155', which will drive screw 154' to move the card 145 up or down (as required) to balance the light on the sensors. When it is balanced, the matrix is in proper position in a vertical direction. A similar set of prisms, sensors, amplifier, etc., in conjunction with motor 155 will serve to position the card transversely.

By this means, the subject records can be precisely positioned with respect to the hologram mounting means. In a similar way, the reference beam code masks 136, of FIG. 9, having patterns of spots and guide indicia can be positioned with respect to the hologram positioning means. Also, if the hologram film, when first positioned in the hologram positioning means has recorded on it a pattern of guide indicia, then after development, these indicia by means such as shown schematically in FIG. 11, can be used to position the developed hologram with respect to the hologram positioning means. Thus all three interacting elements, subject card, reference beam mask means, and holographic film can be separately and accurately positioned with respect to the hologram positioning means, and therefor with respect to each other.

Having positioned the subject card 145 to the proper position with respect to the frame 175 it is possible to disconnect the servo amplifier and by means such as motor 192, drive 191 and differential gear 190 to insert an incremental displacement of the card corresponding to position 157, for example.

To facilitate the precise placement of the subject spot pattern we propose to record on the subject card, guide indicia to facilitate the placement of the subject pattern with respect to the holograph positioning means and the holographic film. These indicia will not only facilitate the placement of the subject card or film strip frame, but in the reconstruction it will facilitate the positioning of the scanner with respect to the pattern of spots.

We show in FIG. 10 a pattern of spots on the subject card 145, with a corresponding array of guide indicia. Also, in FIG. 9 we show that the reference beam 138, 139 can be modified or coded by transmission through a transparency or mask 136, or the like. Since it will be important in the reconstruction to generate the precise same reference beam at the same position on the hologram, we propose that each of the frames of the coding transparency 136 have guide indicia recorded thereon so that, by means such as shown in FIGS. 10 and 11, the coding pattern on 136 can be placed in the precisely same position. We also contemplate recording such indicia on the hologram record 30, so that after development, it can be accurately repositioned in the hologram positioning means of the reconstruction apparatus.

In summary, we contemplate the use of guide indicia on the subject records, and appropriate servo means, responsive to the guide indicia to precisely position the subject pattern record 145 or transparency 136. Also we contemplate placing guide indicia on the code modifying means such as 136 and means to accurately position the code modifying means so as to accurately direct the coded reference beam. Also the hologram film itself, will have guide indicia recorded, so that after being multiple exposed and developed it can be repositioned in the reconstruction apparatus to its precise proper position.

We have shown in the preceding figures and description which are essentially the same as shown in the copending application of one of the present coinventors (a) the principles and practice of recording and deconstructing optical holograms,
(b) means for creating a plurality of different reference beams each having substantially uniform intensity in the beam, but
  (1) reaching the hologram at different angles, or
  (2) reaching the hologram at fixed angles and with different azimuths,
(c) means for creating a plurality of different reference beams each directed at a fixed angle to the hologram, but each coded by a pattern mask to have a different pattern of intensity,
(d) means for precisely relatively positioning the subject, the coding mask and the hologram record.

We will now proceed to show how this type of apparatus can be used to achieve the following objects of the invention, namely to provide a multiple exposure hologram system in which the separate hologram images can be reconstructed and displayed, (a) varied in intensity,
(b) a plurality of images reconstructed simultaneously with different reference beams, and
(c) a plurality of images reconstructed sequentially in a predetermined timed sequence, which is related to the timed sequence in which the images were recorded.

For example, the reconstruction apparatus can be used to display to a small group of observers the images recorded on the film. For this purpose it may be desirable to be able to display two or more images simultaneously for purposes of illustration of apparatus, etc. The various images can be of the same three dimensional subject taken from different azimuthal directions. Thus, by changing the reference beams, such as by rotating the mirror 50 of FIGS. 1 and 2, separate images will be displayed sequentially and in effect, the subject will appear to rotate.

If more than one image is to be reconstructed simultaneously a second mirror like 50 in FIGS. 1 and 2 can be used simultaneously with the mirror 50. To make the geometry of the reconstructing beams the same, it is preferable to use two (or more) such mirrors, such as 220, 221 of FIG. 14 rotating about the axis 222 of the two mirrors. The two or more mirrors 220, 221 can be used with appropriate sets of mirrors similar to 55, to reconstruct more than one image simultaneously.

In FIGS. 12 and 13 we show a preferred embodiment similar that of FIG. 8 but having a plurality of fixed mirrors 255 mounted on a ring 264 concentric with axis 260. The center of the ring is open, permitting the mirror 259 to irradiate the subject 251 as by beam 280 and the subject to redirect radiation back to the record medium 250 as by beams 281. These mirrors are mounted at the proper angles such that when one of the plurality of fixed mirrors 256 such as 256*a* receives light from the laser 20, it reflects it to one of the mirrors 255, as by beam 283, and thence by beam 284 to the film 285. Similarly, each of the mirrors 256*a* 256*b*, 256*n*, etc., receives light from the laser and cooperates with a particular one of the mirrors 255*a*, 255*b*, 255*n*, to form one of a plurality of reference beams, each reaching the film first surface from a direction different from that of each of the others. Since we may wish to provide light from more than one of the mirrors 255 at the same time, we provide shutters 257, one in each of the light paths from the mirrors 256 and operable remotely by means not shown but well known in the art. For example as in FIG. 15 a simple magnetic relay can carry a shutter or vane that can be displaced by passing a current through the relay coil. The vane can operate to control the light from the mirror 256.

We contemplate further that each of the reconstructed images can be changed in intensity independently, so that when two images are reconstructed simultaneously, by controlling the intensity of each of the images, one image can be made to fade or decrease in intensity, while the other can be made to increase in intensity. By this means there can be a smooth transition between the two images.

We show in FIG. 15 one way to accomplish this fading from one image to the other. This fader 290 comprises a frame 291 of magnetic material, a core 297, a coil 292 wound on the core, with leads 293. A hinged armature 294 is actuated by spring 295 to pull away from the core, while the magnetic pull of the core tends to overcome the pull of the spring to pull the armature into contact with the core. The armature carries a vane or mask 296 to intercept the light from the mirror 256. This vane can assume a number of shapes and positions 296, 296′, 296″ etc. in each of which the amount of light passed is changed so that the reconstructed image varies from bright to dim, or vice versa. These changes are accomplished by varying the magnetic pull of the coil 292 as by varying the current by means of resistor 298, battery 299 and switch 300. Of course other types of masks and/or light control valves may be used.

Up to now, we have considered that in the use of this apparatus for storage of information, and for display, that each subject for each of the superimposed holograms would be different. They need not be different, however, although it would be of little value to record the exact same subject without any change whatsoever.

If there is any change, such as a view of the same subject, but at a different azimuth, or with a slight movement, we would call this a different but related subject. Similarly, if the subject has movable parts, and one of the parts moves between the times of any two exposures, these would be different but related subjects. Similarly, if a part of the subject vibrates and so moves, ever so slightly, between the two exposures, these are also different, but related subjects.

In FIGS. 12 and 13 we show such a subject 251, comprising a base 252, upright 253 and arm 254, which under proper excitation, not shown, is caused to vibrate. It is possible to record two separate views of this subject; one with the arm unexcited and another with the arm vibrating. Or we can take one view, with the vibrating arm in one state of vibration, and the second view in another state of vibration. These can both be taken with the same reference beam, so that in the reconstruction process both images can be reconstructed simultaneously, and interference fringes will be visible indicating the extent of motion of the arm 254 between the times of the two views.

We propose to make a plurality of holographic exposures of the film 250 with the subject 251. However, each exposure will be made with a different reference beam, so that its image can be reconstructed separately from that of each of the others. The exposures are thus made with different reference beams from different mirrors 256 and 255, and different shutters or masks 257. We plan to operate the masks 257 in accordance with a different position of the arm 254 in its cycle of vibration. Thus, the images when reconstructed will show these different positions in three dimensions, in timed sequence. And further, we contemplate in reconstruction, to operate the shutters 257 in a different timing pattern from that used in recording, in sequence, to show, in slow motion, the vibration of the arm 254. This might be called a holographic stroboscopic record, which can be used to show all details, in three dimensions, of the vibrating system, all on a single record sheet.

These holograms would be recorded in short exposures made in the proper timing and sequence. We show in FIG. 13 one embodiment of an apparatus for timing the holographic exposures. This involves a variable frequency oscillator 271 sending a uniformly pulsed signal by line 272 to a control 273. This control through switch 274 and line 275 sends pulses to the electrooptic shutter or light valve 270 that responds to each electrical pulse by passing a pulse of light 23 from the laser 20 to the mirror 259 and to the subject 251 by beam 269. The shutter 270 also sends light from laser 20 to the mirrors 256, masks 257 and mirrors 255 as described above. The control also sends pulses over cable 280 to the masks so that each one opens in sequence to pass light from the mirrors 256 to mirrors 255. The rate of repetition of these pulses is controlled by the oscillator 271, in a manner well known in the art.

To get sufficient coherent light to record the holograms it may be desirable to use a pulsed laser, instead of a continuous wave laser. This art is well known and commercial devices are available on the market. The pulses of the laser would then be timed by the control 273 and would obviate the need of the electrooptic shutter 270.

In summary, we make a plurality of holograms on a single film, with different reference beams. Each exposure is timed to show a different phase of the cycle of vibration or other movement of the subject. After the film is developed and replaced in the reconstruction apparatus, each of the images can be reconstructed in turn, and if taken in the proper sequence and with the proper time intervals, the entire motion of the vibrating system can be observed in slow motion. Also, by using two reference beams, for example, one for the one condition of motion and another for another condition of motion, the two images will be reconstructed simultaneously and the interference fringes will be visible showing the exact extent of movement of the system during the time interval between the two exposures. Then a second pair can be viewed, and so on, all of which will provide more information than is now available.

While we show a very simple vibrating arm as a subject, it will be clearly seen that this method is applicable to the study of much more complex vibrating and moving systems.

We have shown in FIGS. 12 and 13 means by which a plurality of holograms can be recorded on a single photographic record sheet, that the separate exposures can be made at precise times controlled by an electronic timing circuit or oscillator. It will be clear also, that the timing of the exposures can be controlled by the moving or vibrating object itself. An example would be to have a rotating object and create a timing signal derived from the angle of rotation of the object, and so on.

The various reference beams can be constructed as illustrated in FIGS. 12 and 13, or they can be constructed in other ways, including those outlined in FIGS, 1, 2, 7, 8, 9. Also, the hologram can be a single stationary frame of photographic material or it can be a single frame on a strip or web of film as in FIG. 6*a*, or multiple overlapping frames on a strip film as in FIG. 6*b*. Also, as in FIG. 6*c* we contemplate making the choice of reference beam responsive to the motion of the strip film, and thus to the particular exposure on the strip that is being reconstructed.

In the illustrations so far described, we have kept our film and subject stationary and have moved the reference beams for each of the different exposures. In FIG. 16 we show another embodiment of this invention. In this embodiment the subject and reference beam are kept fixed, and the recording film is moved, by rotation about two perpendicular axes. This changes the angle of the film with respect to both the subject and the reference beam between each of the exposures.

In FIG. 16, the recording film 300 is positioned within a frame 301 which has a pair of horizontal shafts 302 projecting from each side of the frame. These shafts are supported in bearings 304 in a Y frame 306, so that the frame can be rotated about a horizontal axis through the bearings. The Y frame has a vertical leg 308 supported in bearings 309. Thus the frame can be turned about a horizontal and a vertical axis, both preferably passing through its center.

The frame can be turned in a reproducible manner in steps of fixed angles, by motor 312 and drive 314 in the vertical axis and motor 316 and drive 318 in the horizontal axis. These motors can be reversible step motors that are well known in the art, for example. They can also be servo motors operated in conjunction with encoder discs on each of the shafts. Or they can be ratchet controlled to take up specific successive positions. All of these methods of driving the frame form no part of this invention, and are well known in the art, and so will not be discussed further.

There is a source of coherent radiation such as a laser 320 with its beam 324, optics 326 and output beam 328 directed to a first partially reflective mirror 330, which directs the beam as 332, through a removable mask or shutter 334 to the subject 320 in subject position 321. Part of the illumination of beam 332 impinging on the subject is redirected by diffraction, reflection and scattering back to the recording film 300, as exemplified by beam 336.

Part of the beam 328 goes through the partially reflective mirror 330 as beam 340 to a succeeding mirror 342. The reflected beam 344 passes to plane mirror 346 and back to the recording film 300, as beam 348, which is the reference beam.

In the preparation of the multiple exposure hologram, an unexposed film 300 is placed in the holder 301. A first subject 320*a* is placed in subject position 321. The frame 301 is set with a predetermined angle of elevation (angle about the horizontal axis) and angle of azimuth (angle about the vertical axis). The film is exposed. A second subject 320*b* is placed at 321. Keeping the same azimuth, the frame is rotated by a fixed angle $\theta$ about the horizontal axis. The film is again exposed. The subject is again changed and the elevation angle changed by an additional angle $\theta$, and so on.

The angle $\theta$ is the minimum angular change of direction of the film between two successive exposures for which there is no objectionable interference between the two exposures. There is no sharp precise value for the angle $\theta$. The larger it is, the less the crossfeed or interference between the two exposures. An angle of from 10 to 20 degress or more should be satisfactory for $\theta$.

After the film holder has been turned through a total angle of $n\theta$, where $n$ is an integer, the azimuth is changed by an angle $\theta$, and the same sequence of subject changes, elevation angle changes and exposures again made, and so on. Thus by this process the direction of the film is scanned in azimuth and elevation through all possible directions separated by the angle $\theta$. Preferably the angle $\theta$ corresponds to the ratchet, encoder, or steps of the drive system, so that the frame can rapidly be positioned and repositioned through the entire array of angular positions.

When the film is fully exposed, it is removed from the frame, developed and replaced in the frame. The mask 334 is put into position (by means such as that shown in FIG. 15), to block the beam 332. If the eye 360 is placed on axis 362 and the light source 322 turned on, the image of subject 320 will be seen at position 321. Then as the frame is turned in elevation and azimuth, the series of different subjects will be seen in succession.

While we have shown a number of embodiments of our invention, there are many others that, in view of our description of principles, can be devised by one skilled in the art. For example, the art of optical holography has developed to the point of availability of holograms in color. Such optical techniques are to be included as alternate embodiments of this invention. Also, while we have shown how it is possible to vary the intensity of the beam of radiation used to reconstruct the image to get an image of greater or lesser intensity, we contemplate also, in the preparation of the hologram, to use lesser or greater luminous exposures to provide under-exposed, properly-exposed or over-exposed holograms. This will permit in the reconstruction step, to have certain of the recorded images that will not be reconstructed (to a visible level) by beams of low intensities, while others will be reconstructed. Also, a series of exposures of the same subject can be made with increasing and/or decreasing intensity of exposure. Also, while we have described a planar film record, we contemplate the use of concave-convex recording surfaces, such as cylindrical films of different radius of curvature. We hold that these and other embodiments are part of our invention, and the scope of our invention should not be limited to the embodiments shown, but only by the scope of the appended claims.

We claim:

1. Apparatus for making and reconstructing a plurality of stroboscopic holographic images of a moving object on a single web record medium comprising, (a) means to irradiate a subject to be viewed holographically and stroboscopically, with coherent radiation from a source thereof under control of an irradiation timing control means, (b) a holographic record medium sensitive to said radiation with its first surface facing said subject so as to receive thereon radiation from said source redirected from said subject, (c) means to form a plurality of different reference beams receiving coherent radiation from said source and directing it to said first surface under control of said irradiation timing control means, (d) said radiation being transmitted simultaneously to said subject and to said reference beams, (e) said irradiation timing control means being adapted to control the duration of the time interval of exposure and the times of occurrence of the exposures, (f) means to select said reference beams in a predetermined sequence, (g) means to advance said web record between each exposures by a distance $d$, where $d=D/K$, where D is the longitudinal dimension of the exposed area of said record and K has a value of at least 2, (h) means to develop said hologram, and means to reposition said hologram in its recording position, (i) means to irradiate said surface of said developed hologram with radiation from said plurality of reference beams in the predetermined sequence and in time of irradiation related to the times of occurrence of said irradiation in said recording position, and (j) means to advance said record between each of said irradiations.

2. Apparatus as in claim 1 in which said irradiation timing control means includes stroboscopic means.

3. Apparatus as in claim 1 in which said means to form a plurality of reference beams is responsive to the incremental movement of said web, whereby when said web is moved to a new position, the reference beam is changed to a new reference beam.

4. Apparatus as in claim 1 in which said means to form a plurality of reference beams comprises optical means to change the direction of the reference beam.

5. Apparatus as in claim 1 in which said means to form a plurality of reference beams comprises optical means to change the azimuth of the reference beams.

6. Apparatus as in claim 1 in which the plane of said web is rotated by a predetermined angle between exposures.

7. Apparatus as in claim 1 including means to separately change the intensity of the reference beams irradiating said record medium.

8. Apparatus as in claim 1 in which said irradiation timing control means includes means to provide simultaneous irradiation by a plurality of reference beams.

9. Apparatus for the storage and retrieval of information comprising, (a) support means, (b) means for positioning on said support means a radiation sensitive web record medium in a hologram positioning means, (c) means for sequentially positioning a plurality of subjects in front of the first surface of said medium on a subject line at a predetermined angle to said first surface, and said subject adapted to redirect radiant energy impinging on its surface to said surface, (d) means on said support means to generate a plurality of reference beams each of substantially uniform intensity and each directed to reach said first surface at a direction different from that of each of the other reference beams, the radiation from said object and said reference beams superimposed on said web record and exposing said record over an area of dimension D, (e) means to incrementally move said web a distance $d$ between each exposure of said record, where $d=D/K$ where K has a value of at least 2, (f) a source of coherent radiation positioned on said support means and means for directing the radiation from said source simultaneously to said subject and to one of said reference beams, (g) means to separately control the intensity of the irradiation of the hologram record by each of said plurality of reference beams, and (h) means to apply a plurality of reference beams to said hologram simultaneously whereby a corresponding plurality of images are reconstructed.

10. An apparatus for utilizing a developed photographic holographic web record having at least two partially superimposed exposures formed with at least first and second reference beams having first and second directions of arrival to the record surface respectively, the web record having been advanced between said exposures by a distance $d$, where $d=D/K$, where D is the longitudinal dimension of the exposed area of said record and K has a value of at least 2, comprising in combination, (a) means for fixing such holographic record in a reference position, (b) means for simultaneously irradiating the said record surface with a first reference beam of coherent radiation, having said first direction and with a second reference beam of coherent radiation, having said second direction, (c) means to incrementally advance said web record by a distance *d*, and (d) means for utilizing the resultant reconstructed images while relatively controlling the intensities thereof.

11. The apparatus of claim 10 wherein the means for irradiating are disposed in an arcuate array and the record surface is planar.

12. The apparatus of claim 10 wherein the record surface is concavoconvex and said means for irradiating comprises a plurality of sources in a planar array.

13. In the method of preparing and utilizing a photographic hologram in which a web record is given a first simultaneous exposure to a first object beam and a first reference beam having a first direction, and is given a second simultaneous exposure to a second object beam and a second reference beam having a second direction, all of said beams being of coherent radiation of the same frequency, the improvement comprising the steps of;

(a) in the preparation of said hologram, incrementally advancing the web record between said first and second irradiations by a distance *d* where $d=D/K$ where D is the longitudinal dimension of the area of the first exposure and K has a value of at least equal to 2, and (b) in the utilization of said hologram, simultaneously exposing said hologram to said first and second reference beams while incrementally advancing said web record a distance *d*, while (c) utilizing the images reconstructed by said irradiations.

14. The method as in claim 13 including the additional step, simultaneously with steps (b) and (c), of relatively controlling the intensities of said first and second reference beams.

15. The method of claim 14 including the step of controlling said intensities of said first and second reference beams as a function of the incremental advance of said web record.

16. The method as in claim 13 in which said first and second directions are at different angles with said web record, but at the same azimuth.

17. The method as in claim 13 in which said first and second directions are at the same angle with said web record, but at different azimuths.

18. The method as of claim 13 in which said first and second irradiations are stroboscopically controlled.

References Cited

UNITED STATES PATENTS 3,364,497 1/1968 MacAdam -------- 350—162X

OTHER REFERENCES

Paques et al.: "Cineholography," pp. 1–4 (June 1965).

Pennington: "How to Make Laser Holograms," Microwaves, pp. 35–40 (October 1965).

Erdos: "Holographic Information Storage and Retrieval," IBM Technical Disclosure Bulletin, vol. 9, No. 3, p. 291 (August 1966).

DAVID SCHONBERG, Primary Examiner

R. L. SHERMAN, Assistant Examiner

U.S. Cl. X.R.

352—85